US012691954B2

(12) United States Patent
Tsukada et al.

(10) Patent No.: US 12,691,954 B2
(45) Date of Patent: Jul. 28, 2026

(54) WORK VEHICLE

(71) Applicant: Kubota Corporation, Osaka (JP)

(72) Inventors: Yosuke Tsukada, Sakai (JP); Tomoyuki Ukai, Sakai (JP)

(73) Assignee: Kubota Corporation, Osaka (JP)

( * ) Notice: Subject to any disclaimer, the term of this patent is extended or adjusted under 35 U.S.C. 154(b) by 272 days.

(21) Appl. No.: 18/641,557

(22) Filed: Apr. 22, 2024

(65) Prior Publication Data

US 2024/0359751 A1     Oct. 31, 2024

(30) Foreign Application Priority Data

Apr. 26, 2023     (JP) ................................. 2023-072428

(51) Int. Cl.
| | |
|---|---|
| *B62D 33/00* | (2006.01) |
| *B62D 33/03* | (2006.01) |
| *B62D 33/033* | (2006.01) |
| *B62D 33/037* | (2006.01) |

(52) U.S. Cl.
CPC ........... *B62D 33/033* (2013.01); *B62D 33/03* (2013.01); *B62D 33/037* (2013.01)

(58) Field of Classification Search
CPC ..... B62D 33/033; B62D 33/03; B62D 33/037

USPC ........................................................ 296/57.1
See application file for complete search history.

(56) References Cited

U.S. PATENT DOCUMENTS

| | | |
|---|---|---|
| 5,004,287 A | 4/1991 | Doyle |
| 8,215,718 B2 * | 7/2012 | Waldner ................... E05C 1/08 |
| | | 298/17 R |
| 2021/0086843 A1 | 3/2021 | Ishii et al. |
| 2022/0194490 A1 | 6/2022 | Wilson et al. |

FOREIGN PATENT DOCUMENTS

| | | |
|---|---|---|
| JP | 63156882 U | 10/1988 |
| JP | 202149789 A | 4/2021 |

* cited by examiner

*Primary Examiner* — Steven O Douglas
(74) *Attorney, Agent, or Firm* — The Webb Law Firm

(57) ABSTRACT

With a shaft and a support attached to each other, a gate is swingable about a horizontal axis between a standing position and an open position and detachable from a floor. A holder is included that is manually operable between (i) a first position, in which the holder prevents the shaft and the support from becoming apart from each other and holds the gate in such a manner that the gate is swingable about the axis, and (ii) a second position, in which the holder allows the shaft and the support to become apart from each other and allows the gate to be detached from the floor.

10 Claims, 12 Drawing Sheets

WORK VEHICLE

CROSS-REFERENCE TO RELATED APPLICATION

This application claims priority to Japanese Patent Application No. 2023-072428 filed Apr. 26, 2023, the disclosure of which is hereby incorporated by reference in its entirety.

BACKGROUND OF THE INVENTION

Field of the Invention

The present invention relates to a work vehicle including a body provided with a travel device in the form of wheels or a crawler travel device and a cargo box on the body.

Description of Related Art

JP 2021-49789 A1 discloses a work vehicle including a cargo box on its body. The cargo box includes at a back portion thereof a gate swingable about a lateral axis between a standing position and an open position.

There has been a demand for a work vehicle including a cargo box on its body to be configured such that the cargo box includes a gate that is not only swingable between a standing position and an open position, but also detachable from the floor of the cargo box.

SUMMARY OF THE INVENTION

The present invention has an object of providing a work vehicle including on its body a cargo box with a gate that is swingable between a standing position and an open position and that is easily detachable from the floor of the cargo box.

A work vehicle of the present invention includes: a body; a travel device provided for the body; a cargo box disposed on the body and including a floor and a gate; a shaft on a first one of the floor and the gate; a support on a second one of the floor and the gate; and a holder, with the shaft and support attached to each other, the gate being swingable about a horizontal axis of each of the shaft and the support between a standing position, in which the gate is oriented upward from the floor, and an open position, in which the gate is oriented downward from the floor, the gate being detachable from the floor with the shaft and the support apart from each other, the holder being manually operable between (i) a first position, in which the holder prevents the shaft and the support from becoming apart from each other and holds the gate in such a manner that the gate is swingable about the axis, and (ii) a second position, in which the holder allows the shaft and the support to become apart from each other and allows the gate to be detached from the floor.

The work vehicle configured as above includes a cargo box that includes a floor and a gate with a shaft and a support thereon, and allows a worker to attach the shaft and the support to each other for the gate to swing between a standing position and an open position.

The above configuration allows the worker to move the holder to the first position to prevent the shaft and the support from becoming apart from each other. This in turn allows the worker to easily swing the gate between the standing position and the open position.

When detaching the gate from the floor, the worker moves the holder from the first position to the second position to allow the shaft and the support to become apart from each other. This in turn allows the worker to easily detach the gate from the floor.

When the worker attaches the shaft and the support to each other and attaches the gate to the floor, the worker then simply moves the holder from the second position to the first position.

The above configuration allows a worker to move the holder from the first position to the second position to attach and detach the gate to and from the floor, and eliminates the need to, for example, tighten and loosen a bolt. The above configuration thereby provides a work vehicle including a cargo box with a gate having improved workability in its attachment and detachment.

The work vehicle may preferably include: an urging section urging the holder toward the first position.

With the above configuration, moving the holder to the first position causes the urging section to urge the holder toward the first position. This inhibits the holder from being moved out of the first position by, for example, vibration during travel.

The above configuration requires a worker to move the holder from the first position to the second position against the urging force of the urging section. The resistance of the urging force reminds the worker that the worker will be detaching the gate.

The work vehicle may preferably include: a second position holder configured to hold the holder in the second position.

The above configuration allows a worker to, when detaching the gate from the floor, move the holder from the first position to the second position and use the second position holder to hold the holder in the second position.

This prevents the holder from being moved from the second position to the first position, which would otherwise make it difficult for the worker to detach the gate from the floor. The above configuration thereby provides a work vehicle including a cargo box with a gate having further improved workability in its attachment and detachment.

The work vehicle may preferably be further configured such that the gate is at a back or front portion of the floor, the shaft is disposed laterally on the gate, the support is an upwardly open depression in the floor, and the gate is swingable about the axis with the shaft in the depression and detachable from the floor with the shaft apart upward from the depression.

The above configuration allows the shaft on the gate to be in the depression in the floor and rotate therein for the gate to swing between the standing position and the open position.

A worker is able to move the holder to the second position and lift the gate to move the shaft upward apart from the depression for detachment of the gate from the floor. Further, a worker is able to place the shaft into the depression from above for attachment of the gate to the floor.

The above configuration thereby provides a work vehicle including a cargo box with a gate having further improved workability in its attachment and detachment.

Suppose, for instance, that a worker has moved the holder to the second position and accidentally started driving the work vehicle without detaching the gate from the floor.

With the above configuration, the upwardly open depression in the floor allows the shaft on the gate to be moved out upward, but prevents the shaft from being moved in the front-back direction.

This inhibits the shaft, in the above supposed case, from being moved out of the depression due to front-back vibration of the gate.

The work vehicle may preferably be further configured such that the holder has an opening, with the holder in the first position, the shaft is in the depression and has an end in the opening, and in the first position, the holder engages with the shaft to prevent the shaft from becoming apart upward from the depression.

The above configuration allows a worker to, after placing the shaft into the depression to attach the gate to the floor, move the holder to the first position to insert an end of the shaft into the opening in the holder.

The shaft engaging with the holder as above prevents the shaft from becoming apart upward from the depression, and also prevents the holder from being moved out of the first position by, for example, vibration during travel.

The work vehicle may preferably be further configured such that the gate is at a lateral portion of the floor, the shaft is disposed on the floor in a front-back direction, the support is a boss disposed on the gate in the front-back direction, and the gate is swingable about the axis with the shaft in the boss and detachable from the floor with the boss apart forward or backward from the shaft.

The above configuration allows the shaft on the floor to be in the boss on the gate, and allows the boss to rotate around the shaft for the gate to swing between the standing position and the open position.

With the above configuration, a worker is able to move the holder to the second position and move the gate forward (or backward) to move the boss on the gate forward (or backward) apart from the shaft on the floor for detachment of the gate from the floor. Further, a worker is able to move the gate backward (or forward) to fit the boss around the shaft for attachment of the gate to the floor.

The above configuration thereby provides a work vehicle including a cargo box with a gate having further improved workability in its attachment and detachment.

The work vehicle may preferably be further configured such that the holder has an opening, with the holder in the first position, the shaft is in the boss and has an end in the opening, and in the first position, the holder engages with the boss to prevent the boss from becoming apart forward or backward from the shaft.

The above configuration allows a worker to, after fitting the boss on the gate around the shaft on the floor to attach the gate to the floor, move the holder to the first position to insert an end of the shaft into the opening in the holder.

The boss engaging with the holder as above prevents the boss from becoming apart forward (or backward) from the shaft. Further, the shaft engaging with the holder prevents the holder from being moved out of the first position by, for example, vibration during travel.

The work vehicle may preferably be further configured such that the gate is swingable to a lower intermediate position above the open position by an angle, and the work vehicle further includes: a first restrictor configured to prevent the boss from becoming apart forward or backward from the shaft with the holder in the second position and the gate between the open position and the lower intermediate position.

Suppose, for instance, that a worker has moved the holder to the second position and accidentally started driving the work vehicle without detaching the gate from the floor. In such a case, the gate may spontaneously move to the open position due to its self weight or move slightly above from the open position due to vibration during travel.

With the above configuration, the first restrictor prevents the gate from being moved forward (or backward) in response to the gate being moved forward (or backward) due to, for example, vibration during travel with the holder in the second position and the gate between the open position and the lower intermediate position.

This inhibits the boss, in the above supposed case, from becoming apart from the shaft.

The work vehicle may preferably be further configured such that the gate is swingable to an upper intermediate position below the standing position by an angle and above the lower intermediate position, and the work vehicle further includes: a second restrictor configured to prevent the boss from becoming apart forward or backward from the shaft with the holder in the second position and the gate between the standing position and the upper intermediate position.

In a case where a worker moves the holder to the second position and moves the boss on the gate forward (or backward) apart from the shaft on the floor while the gate is close to the standing position, the gate may come into contact with a portion of the body which portion is forward (or backward) of the gate.

The second restrictor, in the above case, prevents the worker's operation.

The above configuration allows a worker to move the holder to the second position and then swing the gate downward from the standing position to a position between the upper intermediate position and the lower intermediate position to move the gate forward (or backward). This in turn allows a worker to easily move the boss forward (or backward) apart from the shaft without bringing the gate into contact with a portion of the body.

The work vehicle may preferably be further configured such that the second restrictor is a fixing section manually operable to fix the gate in the standing position and release the gate from the standing position.

A cargo box with a gate swingable between a standing position and an open position may include a fixing section operable by a worker to fix the gate in the standing position and unfix the gate from the standing position.

With the above configuration, the second restrictor doubles as such a fixing section, with the result of a simplified structure.

DESCRIPTION OF THE INVENTION

FIGS. 1 to 12 illustrate a multipurpose work vehicle. FIGS. 1 to 12 show "F" to indicate the front side, "B" to indicate the back side, "U" to indicate the upward side, "D" to indicate the downward side, "L" to indicate the left side, and "R" to indicate the right side.

Overall Configuration of Work Vehicle

Figure 1:
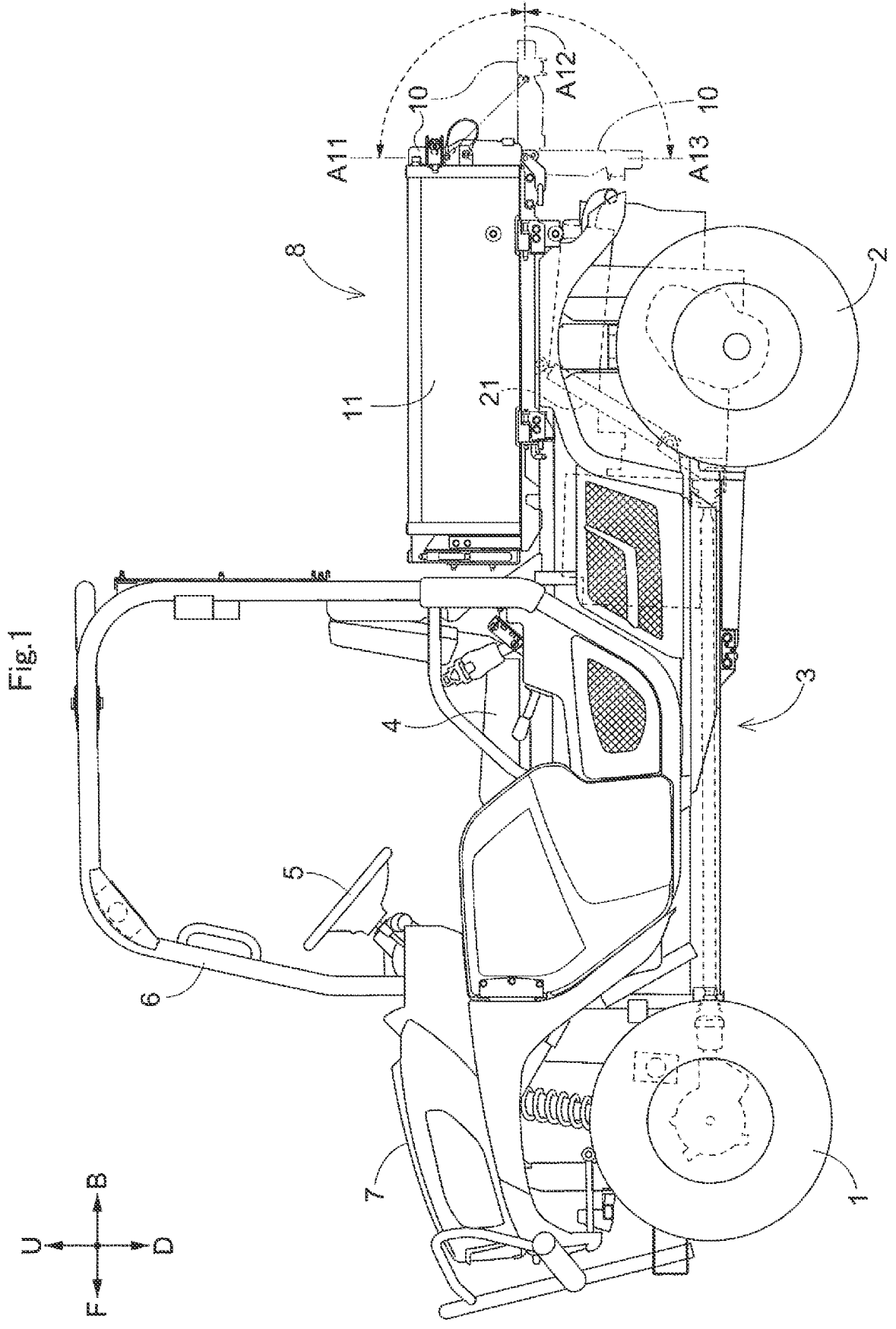
FIG. 1 is a left side view of a work vehicle.
Figure 2:
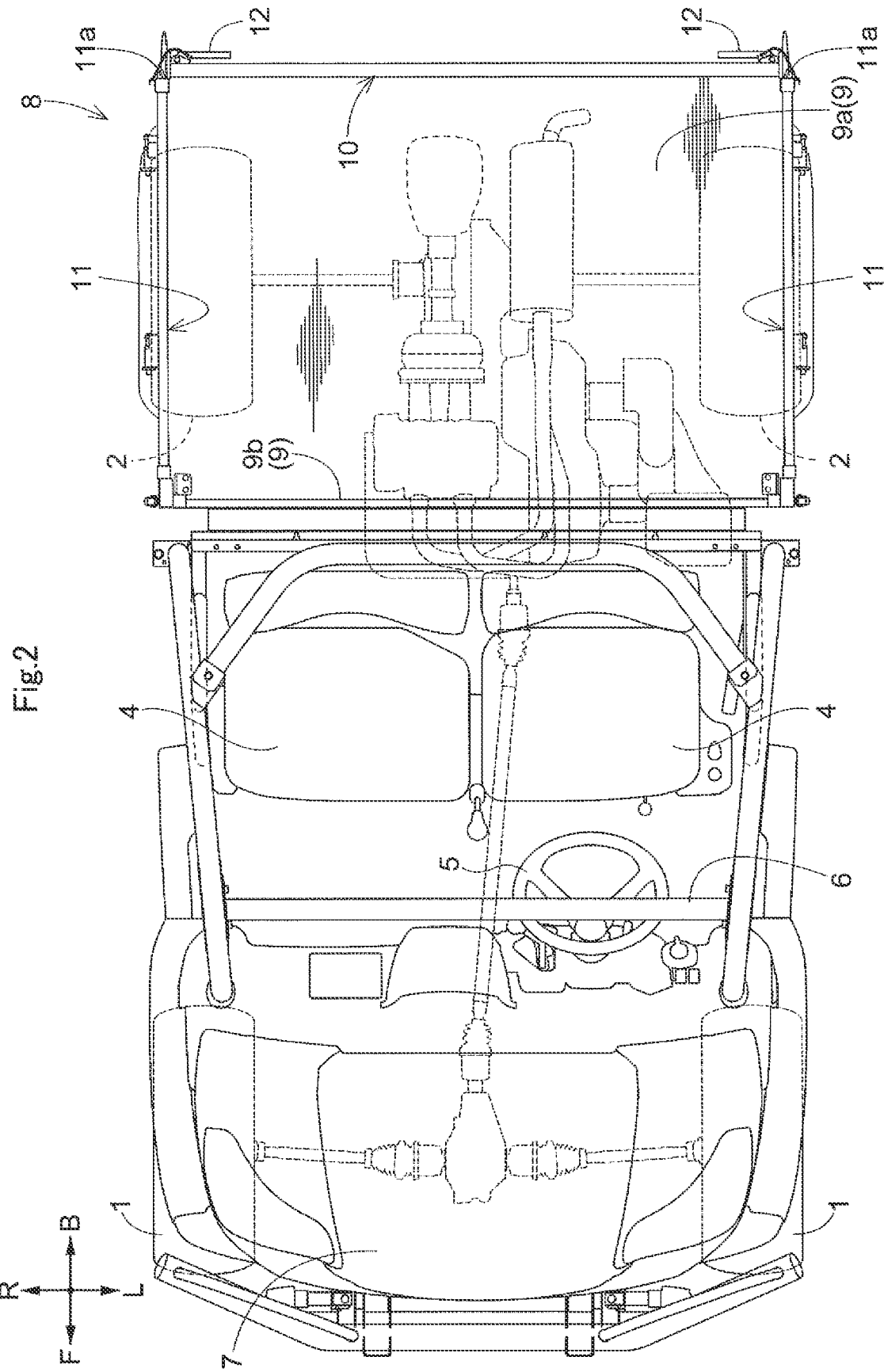
FIG. 2 is a plan view of a work vehicle.

FIGS. 1 and 2 each illustrate a work vehicle including a pair of left and right front wheels 1 (which is an example of the "travel device"), a pair of left and right rear wheels 2 (which is an example of the "travel device"), and a body 3 provided with the front wheels 1 at a front portion thereof and the rear wheels 2 at a back portion thereof. The work vehicle includes on the body 3 a pair of left and right seats 4, a steering wheel 5 for use to turn the front wheels 1, and a roll-over protective structure frame 6. The work vehicle includes a hood 7 at a front portion of the body 3 and a cargo box 8 at a back portion of the body 3.

Overall Configuration of Cargo Box

As illustrated in FIGS. 1 and 2, the cargo box 8 includes a floor unit 9, a rear gate 10 (which is an example of the "gate"), and a pair of left and right side gates 11 (which is an example of the "gate").

The floor unit 9 includes a floor 9a and a front wall 9b coupled to a front end portion of the floor 9a. The rear gate 10 is at a back portion of the floor unit 9. The side gates 11 are at respective left and right portions of the floor unit 9.

The floor unit 9 (specifically, the floor 9a) includes a back portion attached to the body 3 in such a manner as to be swingable about a lateral axis (not illustrated in the drawings). The work vehicle includes a hydraulic cylinder 21 connected to the body 3 and the floor unit 9 (specifically, the floor 9a). Extending and contracting the hydraulic cylinder 11 moves the cargo box 8 between the work position illustrated in FIG. 1 and a dumping position, in which the cargo box 8 has a front portion lifted.

The work vehicle configured as above includes: a body 3, a travel device (that is, the front wheels 1 and the rear wheels 2) provided for the body 3, and a cargo box 8 disposed on the body 3 and including a floor (that is, the floor unit 9) and a gate (that is, the rear gate 10 and the side gates 11).

Outline of Standing Position and Open Positions of Rear Gate

Figure 3:
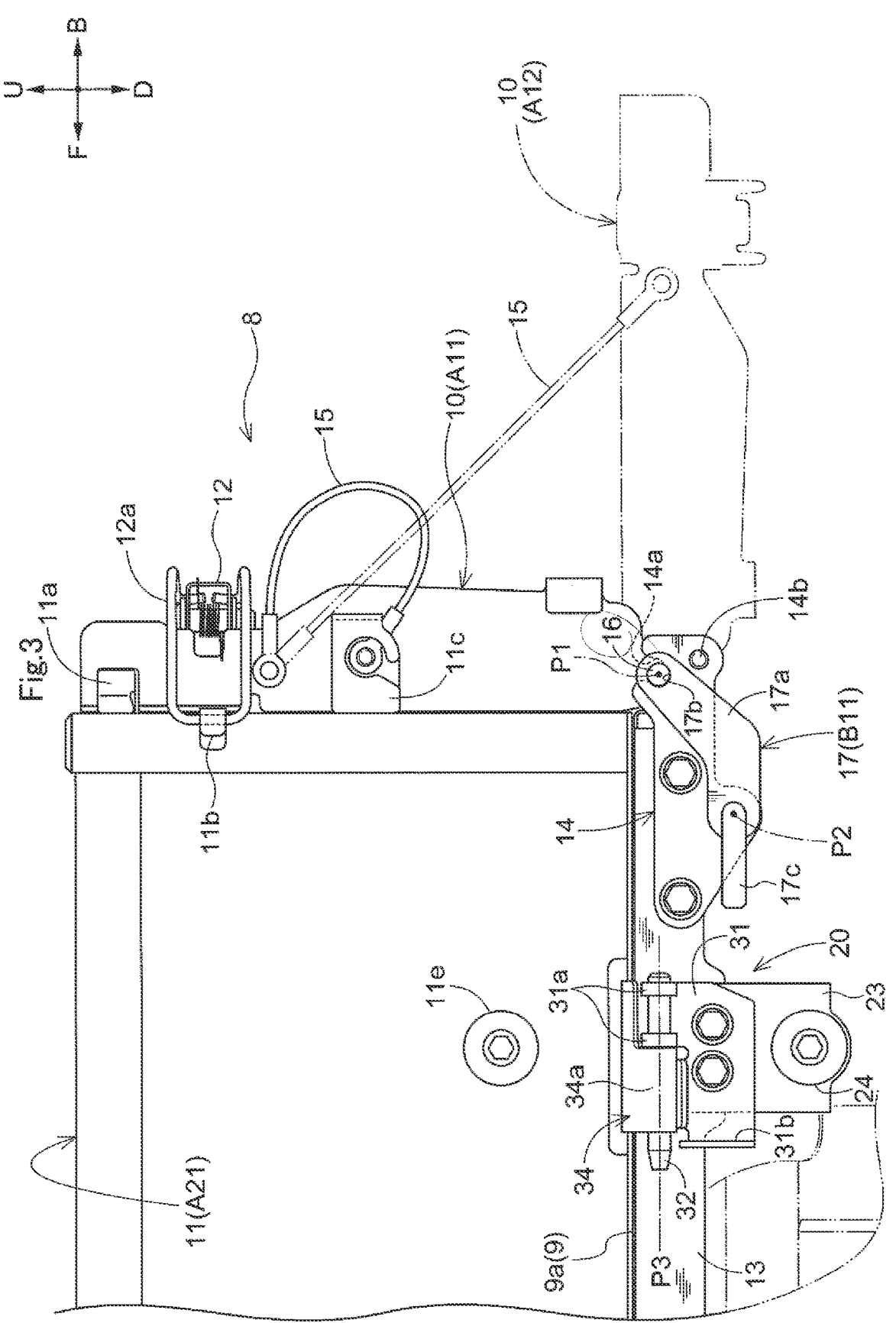
FIG. 3 is a left side view of a rear gate and its surroundings.
Figure 4:
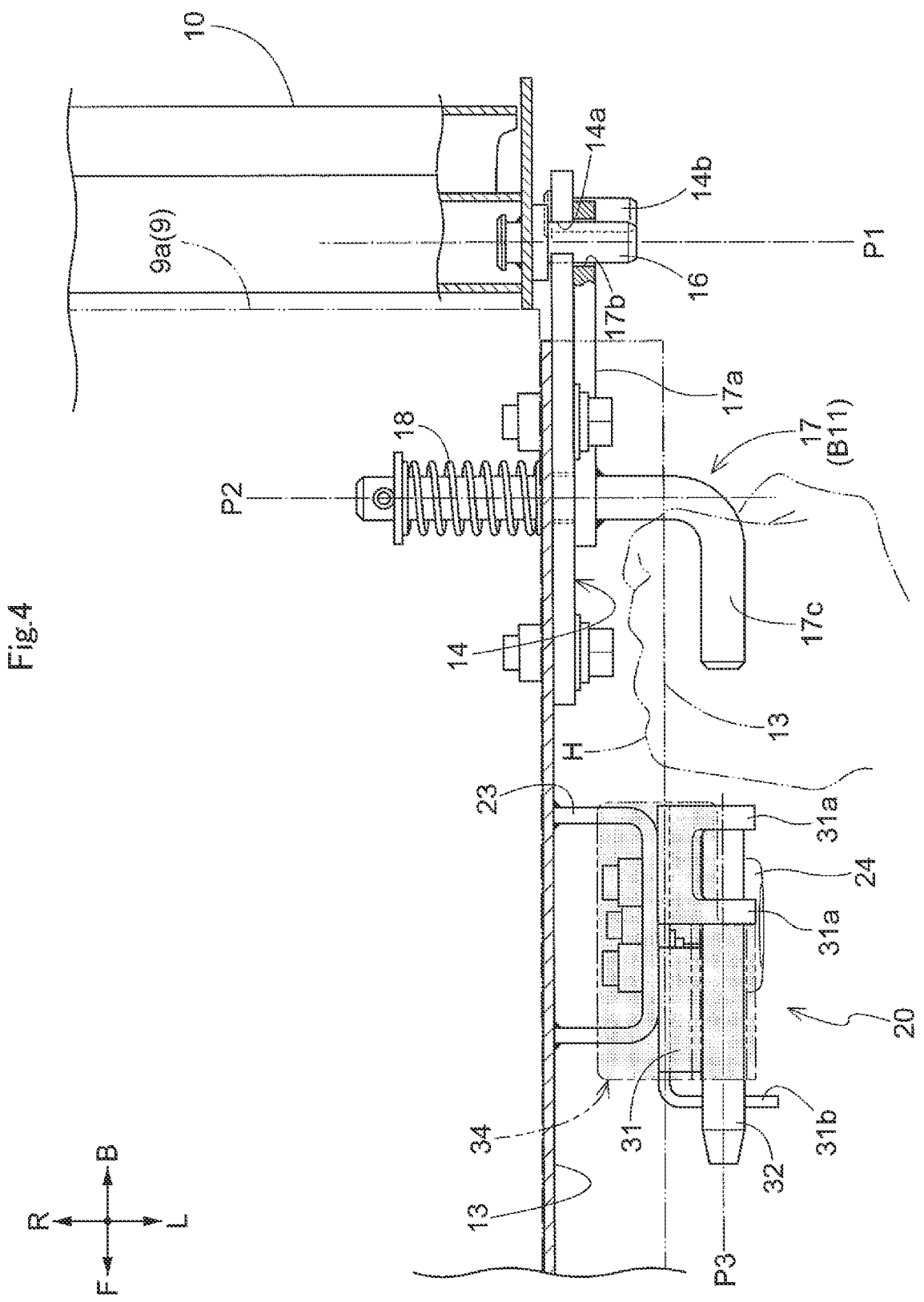
FIG. 4 is a cross-sectional plan view of a left portion of a rear gate and its surroundings.

As illustrated in FIGS. 3 and 4, the work vehicle includes a pair of left and right frame members 13 each extending in the front-back direction from a front end portion of the floor 9a to a back end portion thereof. The work vehicle also includes a pair of left and right support brackets 14 each coupled to a back end portion of the corresponding frame member 13.

As described later, the rear gate 10 is detachably attached to the support brackets 14 in such a manner as to be swingable about a lateral (horizontal) axis P1.

The rear gate 10 is swingable about the axis P1 into a standing position A11, an open position A12, and another open position A13. In the standing position A11, the rear gate 10 is oriented upward from a back end portion of the floor 9a. In the open position A12, the rear gate 10 is oriented backward from the back end portion. In the open position A13 (see FIG. 1), the rear gate 10 is oriented downward from the back end portion.

The rear gate 10 is provided with a pair of left and right lateral fixing handles 12 disposed at respective upper left and right portions thereof and each including an engagement metal fitting 12a. The side gates 11 each include a guide 11a, an engagement section 11b, and an attachment section 11c all at a back portion thereof. The rear gate 10 is provided with a pair of left and right wires 15 disposed at respective left and right portions thereof and each including an end attachable to and detachable from the corresponding attachment section 11c.

In the standing position A11, the rear gate 10 is between the respective guides 11a of the side gates 11 (as the side gates 11 are in a standing position A21 described later). Engaging the engagement metal fittings 12a with the respective engagement sections 11b to fix the fixing handles 12 causes the rear gate 10 to be fixed in the standing position A11.

Operating the fixing handles 12 to detach the engagement metal fittings 12a from the respective engagement sections 11b allows the rear gate 10 to swing backward about the axis P1 into the open position A12. The rear gate 10 is holdable in the open position A12 with use of the wires 15.

With the wires 15 detached from the respective attachment sections 11c while the rear gate 10 is in the standing position A11, the rear gate 10 is swingable about the axis P1 beyond the open position A12 downward into the open position A13 (see FIG. 1), in which the rear gate 10 is oriented downward from the back end portion of the floor 9a.

Figure 5:
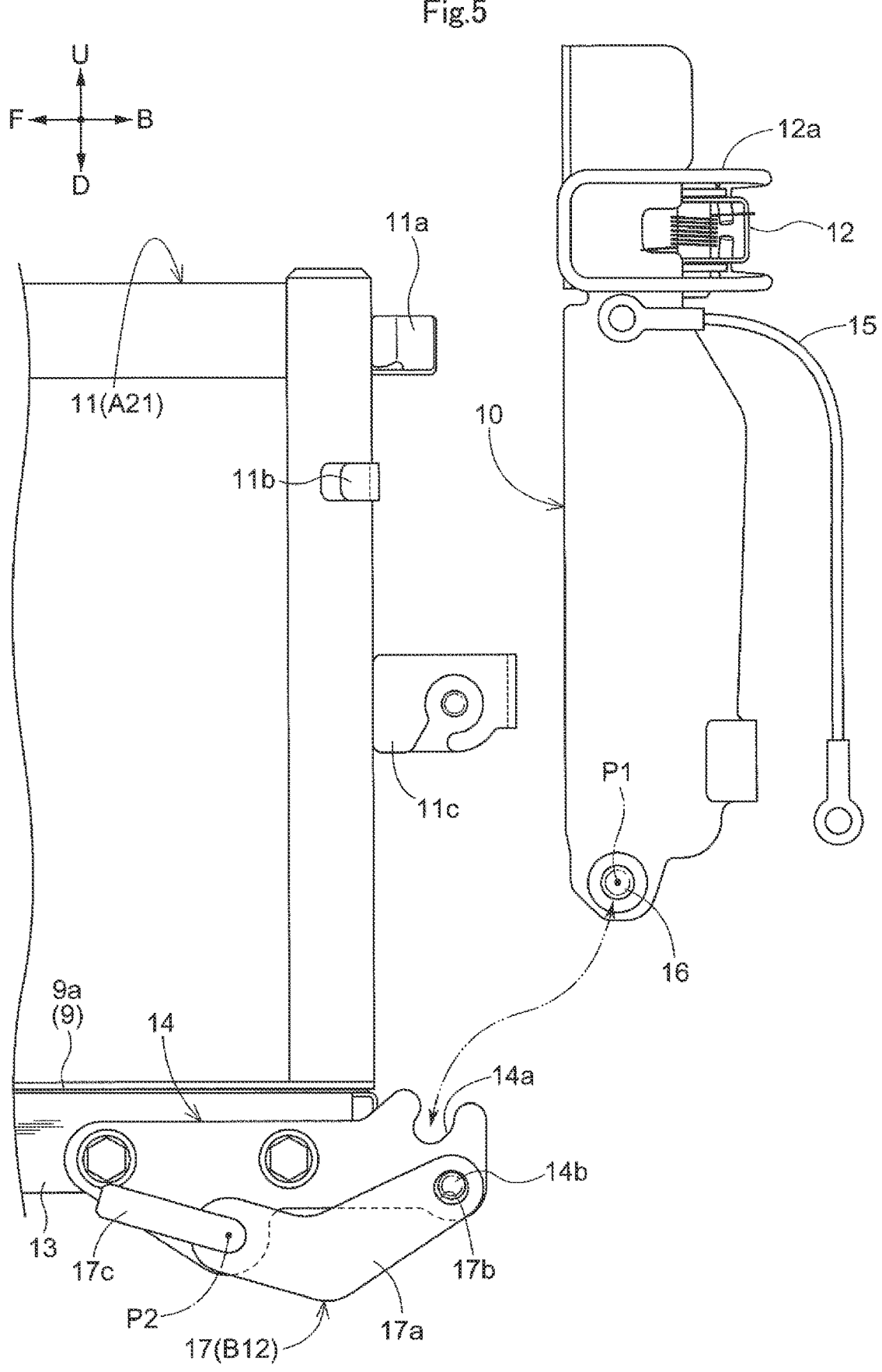
FIG. 5 is a left side view of a rear gate as detached.

Mechanism of how Rear Gate is Swingable into Standing Position and Open Positions As illustrated in FIGS. 3, 4, and 5, the rear gate 10 is provided with a pair of left and right lateral shafts 16 coupled to respective lower left and right portions thereof. The support brackets 14 each include at a back portion thereof an upwardly open depression 14a (which is an example of the "support") and a pin 14b (which is an example of the "second position holder").

With the shafts 16 in the respective depressions 14a, the rear gate 10 is attached to the support brackets 14 in such a manner as to be swingable about the lateral (horizontal) axis P1.

The work vehicle configured as above includes: a shaft 16 on a first one of the floor (that is, the floor unit 9) and the gate (that is, the rear gate 10) and a support (that is, the respective depressions 14a in the support brackets 14) on a second one of the floor (that is, the floor unit 9) and the gate (that is, the rear gate 10).

The above work vehicle is further configured such that with the shaft 16 and the support (that is, the respective depressions 14a in the support brackets 14) attached to each other, the gate (that is, the rear gate 10) is swingable about a horizontal axis P1 of each of the shaft 16 and the support (that is, the respective depressions 14a in the support brackets 14) between a standing position A11, in which the gate (that is, the rear gate 10) is oriented upward from the floor (that is, the floor unit 9), and the open position A13, in which the gate (that is, the rear gate 10) is oriented downward from the floor (that is, the floor unit 9).

Configuration of Holders for Rear Gate

As illustrated in FIGS. 3, 4, and 5, the rear gate 10 is provided with a pair of left and right holders 17 attached to the respective support brackets 14. The holders 17 each include an elongate, plate-shaped body 17a, an opening 17b in the body 17a, and a handle 17c coupled to the body 17a. The left and right holders 17 are symmetrical with each other.

The handle 17c is so bent at an angle as to protrude to the left or right from the body 17a, and is disposed through an opening in the corresponding support bracket 14.

Holding the handle 17c with a hand H, a worker is able to swing the holder 17 about a lateral axis P2 relative to the corresponding support bracket 14 and move the holder 17 laterally along the axis P2.

The rear gate 10 is provided with a pair of left and right springs 18 (which is an example of the "urging section") each disposed between an end of the corresponding handle 17c and the corresponding support bracket 14 and so compressed from its free length as to urge the holder 17 (specifically, its body 17a) toward the support bracket 14 (that is, upward in FIG. 4).

FIGS. 3 and 4 each illustrate a holder 17 in a first position B11. When a holder 17 is in the first position B11, the corresponding shaft 16 is in the corresponding depression 14a and has an end in the opening 17b. The corresponding spring 18 urges the holder 17 toward the corresponding support bracket 14 (that is, upward in FIG. 4), in other words, toward the first position B11.

The shaft 16 having an end in the opening 17b in the holder 17 in the first position B11 prevents the shaft 16 from moving upward out of the depression 14a in response to the rear gate 10 being moved into the standing position A11 or the open position A12 or A13.

Detaching Rear Gate

A worker is able to detach the rear gate 10 from the floor unit 9 as illustrated in FIGS. 3, 4, and 5: Holding the handle 17c of a holder 17 with a hand H, the worker moves the holder 17 away from the corresponding support bracket 14 along the axis P2 (that is, downward in FIG. 4) while compressing the corresponding spring 18 (that is, against the urging force of the spring 18), and pulls the holder 17 off the corresponding shaft 16 so that the shaft 16 is out of the opening 17b.

Next, the worker slightly rotates the holder 17 about the axis P2 clockwise in FIG. 5, and moves the holder 17 toward the support bracket 14 along the axis P2 (that is, upward in FIG. 4) to insert the pin 14b of the support bracket 14 into the opening 17b, whereby the holder 17 is in a second position B12.

With the holder 17 in the second position B12, the pin 14b is in the opening 17b, and the spring 18 urges the holder 17 toward the support bracket 14 (that is, upward in FIG. 4). The pin 14b engaging with the support bracket 14 and the spring 18 urging the holder 17 toward the second position B12 prevents the holder 17 from moving out of the second position B12.

After moving the holder 17 into the second position B12, the worker is able to detach the engagement metal fitting 12a of the corresponding fixing handle 12 from the engagement section 11b of the corresponding side gate 11, detach the corresponding wire 15 from the corresponding attachment section 11c, and move the rear gate 10 upward. This allows the shaft 16 to move upward out of the depression 14a, thereby detaching the rear gate 10 from the floor unit 9.

The above work vehicle is configured such that the gate (that is, the rear gate 10) being detachable from the floor (that is, the floor unit 9) with the shaft 16 and the support (that is, the respective depressions 14a in the support brackets 14) apart from each other.

The above work vehicle may be configured such that the gate (that is, the rear gate 10) is at a back or front portion of the floor (that is, the floor unit 9), the shaft 16 is disposed laterally on the gate (that is, the rear gate 10), and the support (that is, the respective depressions 14a in the support brackets 14) is an upwardly open depression 14a in the floor (that is, the floor unit 9).

The above work vehicle may be configured such that the gate (that is, the rear gate 10) is swingable about the axis P1 with the shaft 16 in the depression 14a and detachable from the floor (that is, the floor unit 9) with the shaft 16 apart upward from the depression 14a.

Attaching Rear Gate

A worker is able to attach the rear gate 10 to the floor unit 9 in a manner reverse to the above as illustrated in FIGS. 3, 4, and 5: The worker places a shaft 16 into the depression 14a in the corresponding support bracket 14 from above.

Holding the handle 17c of the corresponding holder 17 in the second position B12 with a hand H, the worker moves the holder 17 away from the support bracket 14 along the axis P2 (that is, downward in FIG. 4) while compressing the corresponding spring 18 (that is, against the urging force of the spring 18), and pulls the holder 17 off the support bracket 14 so that the pin 14b is out of the opening 17b.

Next, the worker slightly rotates the holder 17 about the axis P2 counterclockwise in FIG. 3, and moves the holder 17 toward the support bracket 14 along the axis P2 (that is, upward in FIG. 4) to insert an end of the shaft 16 into the opening 17b, so that the holder 17 is in the first position B11.

The work vehicle configured as above includes: a holder 17 manually operable between (i) a first position B11, in which the holder 17 prevents the shaft 16 and the support (that is, the respective depressions 14a in the support brackets 14) from becoming apart from each other and holds the gate (that is, the rear gate 10) in such a manner that the gate (that is, the rear gate 10) is swingable about the axis P1, and (ii) a second position B12, in which the holder 17 allows the shaft 16 and the support (that is, the respective depressions 14a in the support brackets 14) to become apart from each other and allows the gate (that is, the rear gate 10) to be detached from the floor (that is, the floor unit 9).

The above work vehicle may include: an urging section (that is, the springs 18) urging the holder 17 toward the first position B11.

The above work vehicle may include: a second position holder (that is, the respective pins 14b of the support brackets 14) configured to hold the holder 17 in the second position B12.

The above work vehicle may be configured such that the holder 17 has an opening 17b, with the holder 17 in the first position B11, the shaft 16 is in the depression 14a and has an end in the opening 17b, and in the first position B11, the holder 17 engages with the shaft 16 to prevent the shaft 16 from becoming apart upward from the depression 14a.

Outline of Standing Position and Open Position of Side Gates

Figure 6:
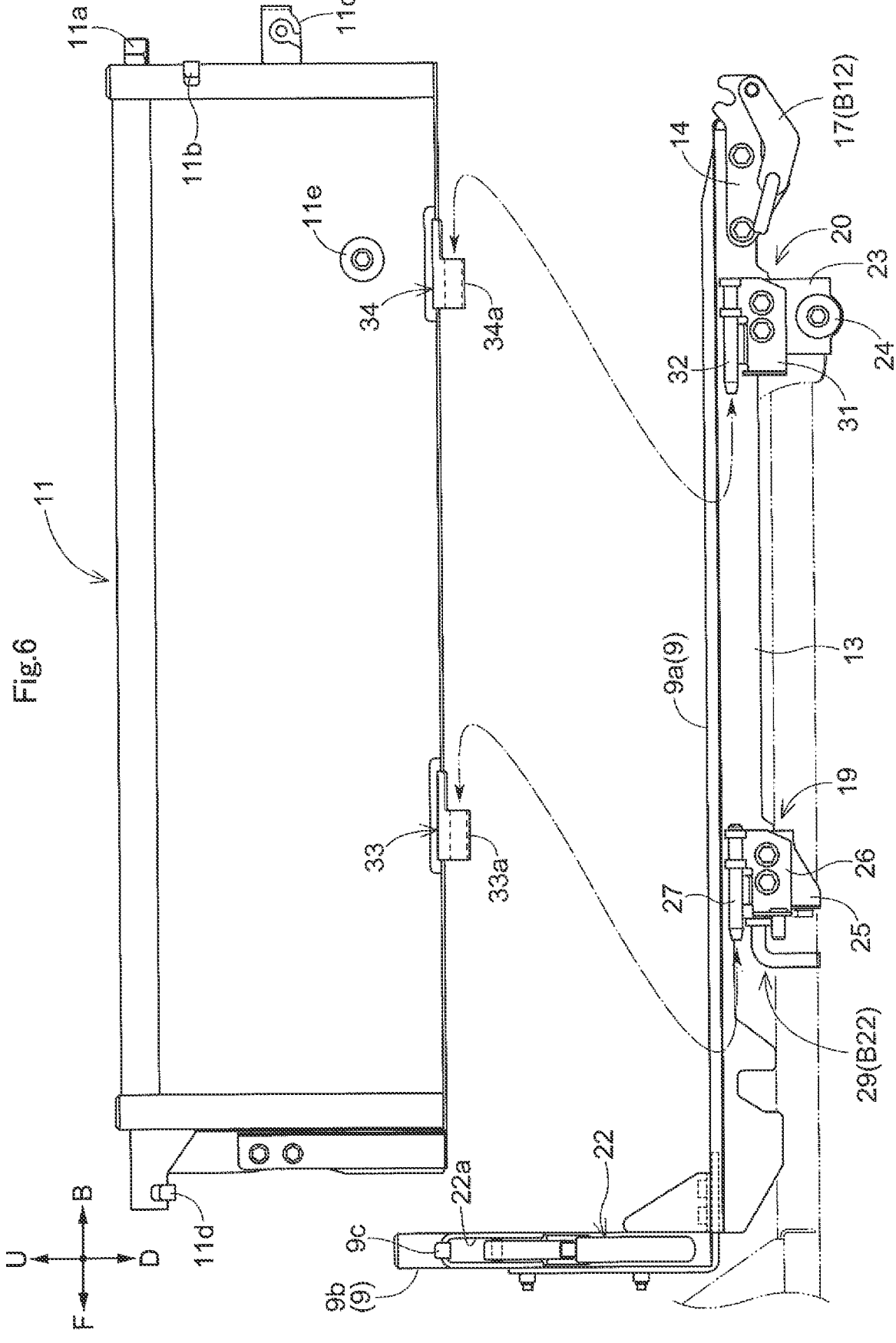
FIG. 6 is a left side view of a side gate as detached.

As illustrated in FIG. 6, the floor 9a of the floor unit 9 is provided with (i) a pair of front pivot sections 19 at respective front left and front right end portions and (ii) a pair of back pivot sections 20 at respective back left and back right end portions. As described below, the side gates 11 are each detachably attached to the corresponding front pivot section 19 and back pivot section 20 in such a manner as to be swingable about a front-back (horizontal) axis P3 (see FIGS. 3 and 7).

Figure 11:
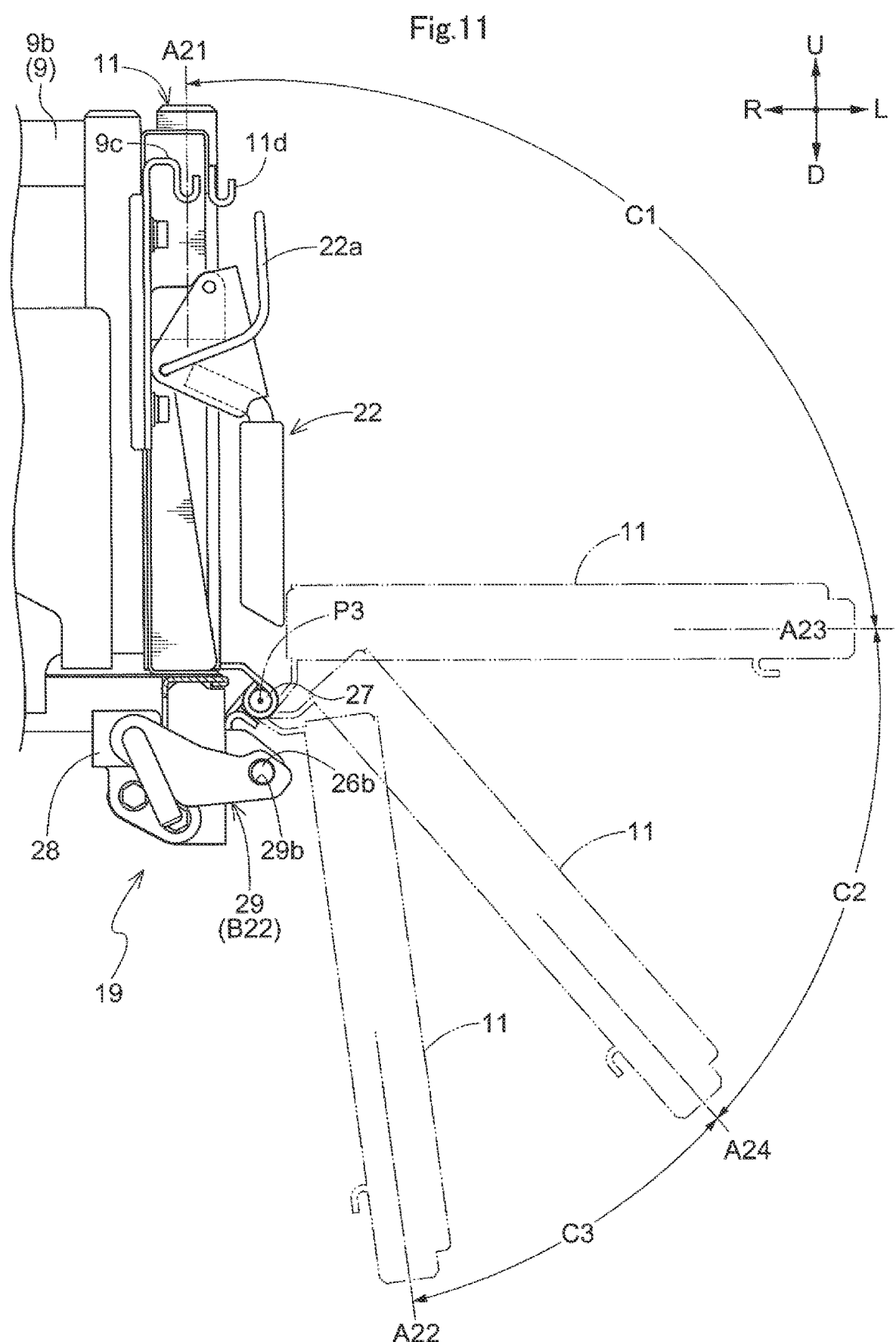
FIG. 11 is a cross-sectional front view of a front pivot section of a side gate and its surroundings, illustrating the side gate in a standing position and an open position.
Figure 12:
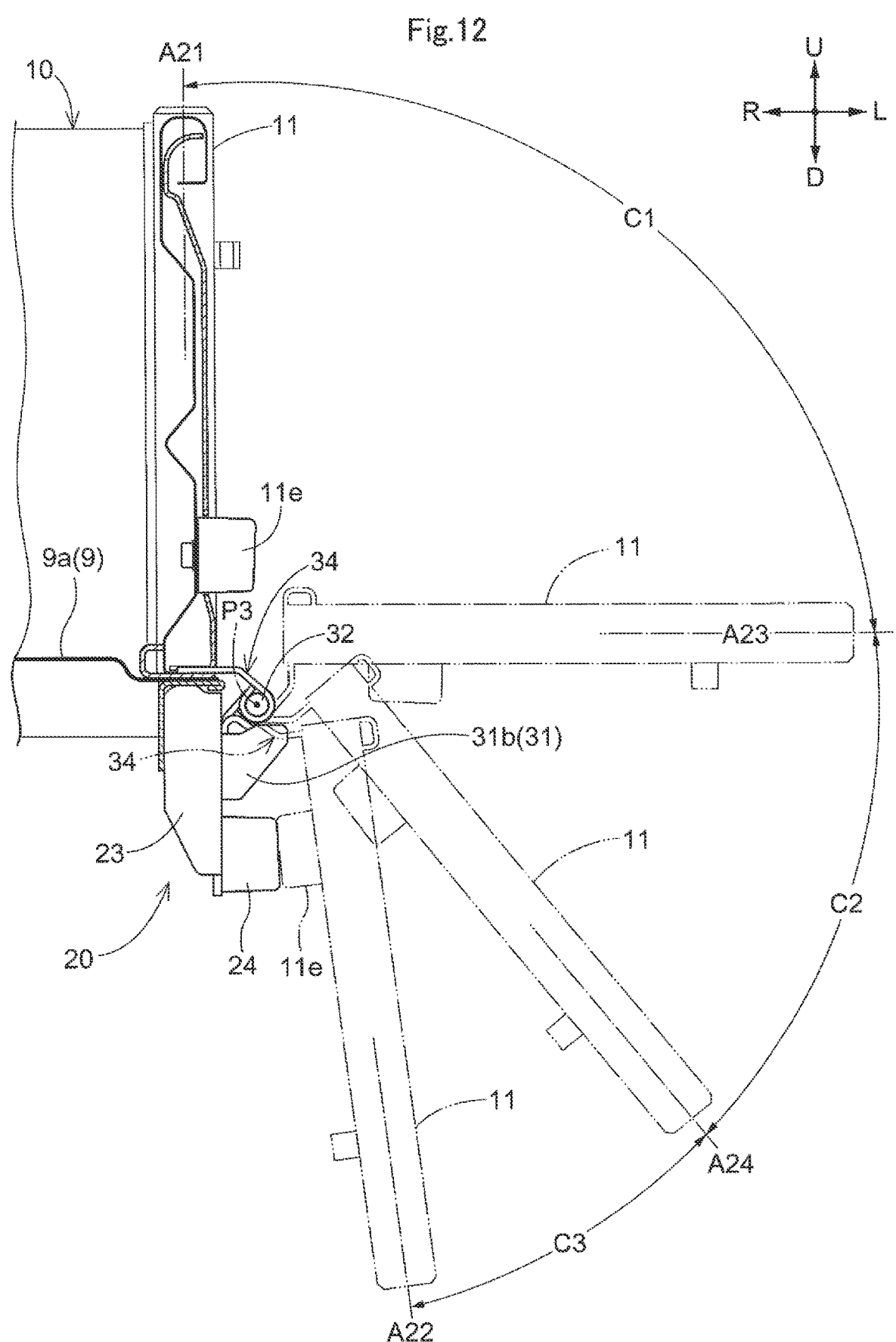
FIG. 12 is a cross-sectional front view of a back pivot section of a side gate and its surroundings, illustrating the side gate in a standing position and an open position.

As illustrated in FIGS. 11 and 12, the side gates 11 are each swingable about the axis P3 between a standing position A21, in which the side gate 11 is oriented upward from a right (or left) end portion of the floor 9a, and an open position A22, in which the side gate 11 is oriented downward from the right (or left) end portion.

Figure 7:
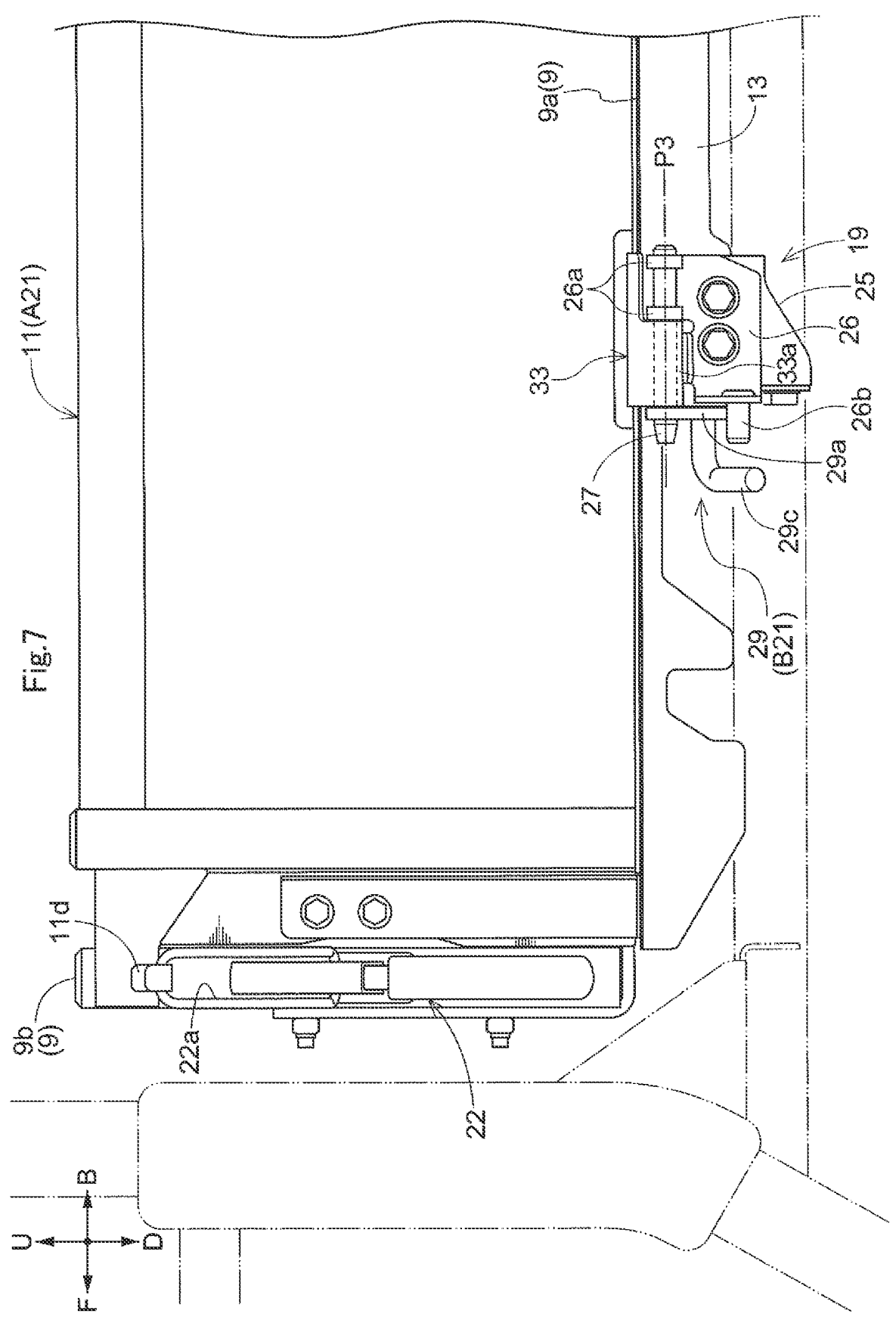
FIG. 7 is a left side view of a front portion of a side gate and its surroundings.

As illustrated in FIGS. 6 and 7, the front wall 9b of the floor unit 9 is provided with, at respective left and right portions thereof, a pair of left and right vertical fixing handles 22 (which is an example of the "second restrictor" and "fixing section") each including an engagement metal fitting 22a. The side gates 11 each include an engagement section 11d at a front end portion thereof.

The side gates 11 each become fixed in the standing position A21 as a result of, with the side gate 11 in the standing position A21, (i) engaging the engagement metal fitting 12a of the corresponding fixing handle 12 with the corresponding engagement section 11b to fix the fixing handle 12 and (ii) engaging the engagement metal fitting 22a of the corresponding fixing handle 22 with the corresponding engagement section 11d to fix the fixing handle 22.

Moving the fixing handles 12 and 22 to detach the respective engagement metal fittings 12a and 22a from the respective engagement sections 11b and 11d allows the side gate 11 to swing about the axis P3 downward into the open position A22.

Figure 10:
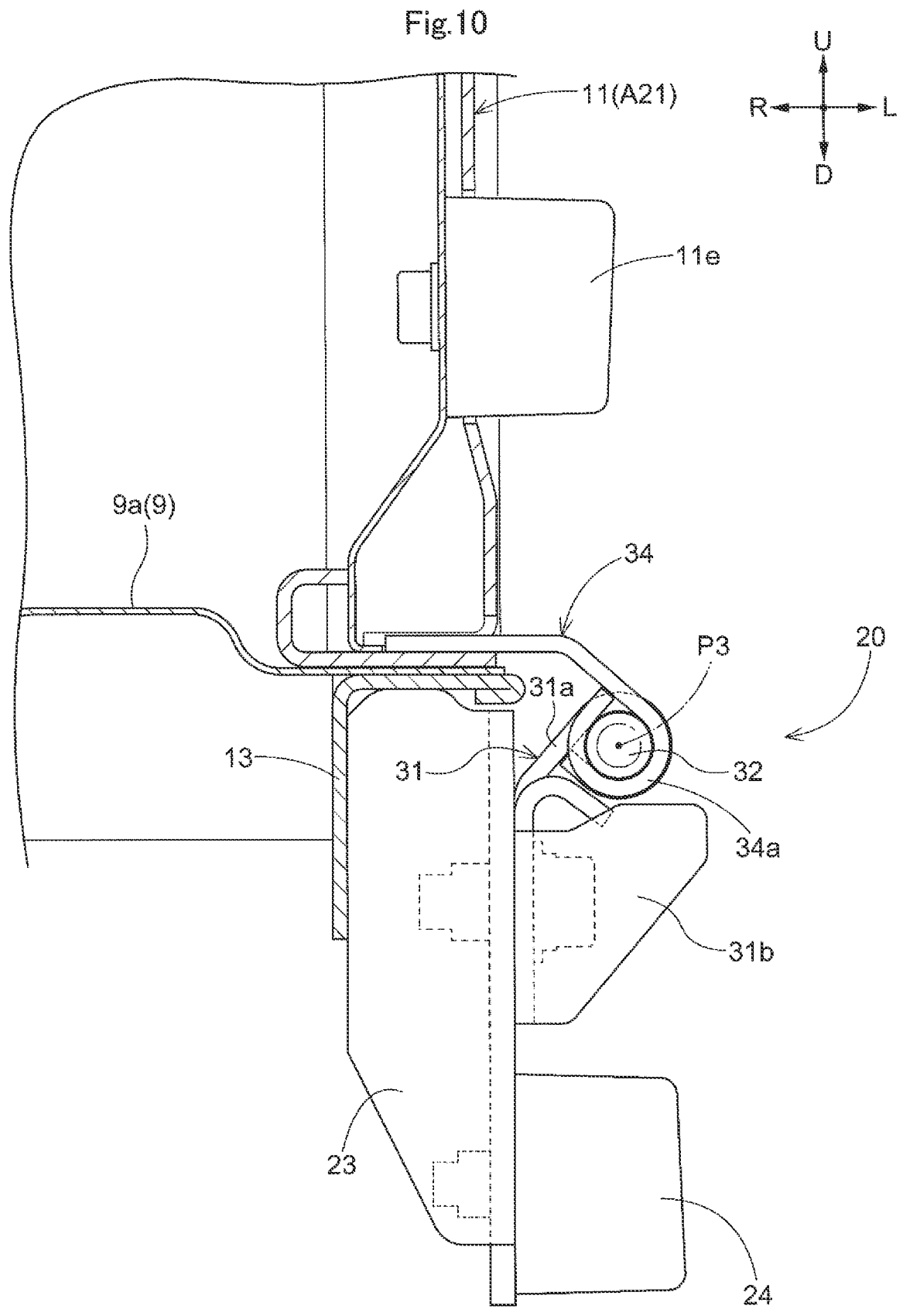
FIG. 10 is a cross-sectional front view of a back pivot section of a side gate and its surroundings.

As illustrated in FIGS. 3, 6, and 10, the frame members 13 are provided with a pair of left and right brackets 23 coupled to respective back portions thereof and each oriented downward from the corresponding frame member 13. The brackets 23 are each provided with a stopper 24 made of hard rubber and attached thereto. The side gates 11 are each provided with a contact section 11e made of hard rubber and attached thereto.

Moving each side gate 11 toward the open position A22 as described above brings the corresponding contact section 11e into contact with the corresponding stopper 24, which stops the side gate 11 in the open position A22 (see FIGS. 11 and 12).

Configuration of Front Pivot Sections of Side Gates

As illustrated in FIGS. 6 to 9, the front pivot sections 19 include a pair of respective left and right brackets 25 coupled to respective front portions of the frame members 13 and each oriented downward from the corresponding frame member 13.

The front pivot sections 19 each include a pivot member 26 coupled to a lateral side face of the corresponding bracket 25 and in the form of a bent plate. The pivot member 26 includes shaft supports 26a at an upper portion thereof and a forwardly protruding pin 26b (which is an example of the "second position holder") at a front portion thereof.

The front pivot sections 19 each include a shaft 27 disposed through the shaft supports 26a of the corresponding pivot member 26 and protruding forward from the shaft supports 26a in the front-back (horizontal) direction. The front pivot sections 19 each include a shaft receiver member 28 coupled to a front face of the corresponding bracket 25 and in the form of a bent plate.

The front pivot sections 19 thus each include a bracket 25, a pivot member 26, a shaft 27, and a shaft receiver member 28. The left and right front pivot sections 19 are symmetrical with each other.

Configuration of Back Pivot Sections of Side Gates

As illustrated in FIGS. 3, 4, and 10, the back pivot sections 20 each include a pivot member 31 coupled to a lateral side face of the corresponding bracket 23 and in the form of a bent plate. The pivot member 31 includes shaft supports 31a at an upper portion thereof and a stopper 31b (which is an example of the "first restrictor") protruding laterally from a front portion thereof.

The back pivot sections 20 each include a shaft 32 disposed through the shaft supports 31a of the corresponding pivot member 31 and protruding forward from the shaft supports 31a in the front-back (horizontal) direction.

The back pivot sections 20 thus each include a bracket 23, a pivot member 31, and a shaft 32. The left and right front pivot sections 20 are symmetrical with each other.

Configuration of Members Attached to Front and Back Pivot Sections of Side Gates As illustrated in FIGS. 6 to 9, the side gates 11 are each provided with a hinge 33 coupled to a front lower portion thereof, protruding laterally from the front lower portion, and having a bent end portion. The side gates 11 are each provided with a cylindrical boss 33a (which is an example of the "support") disposed on the end portion of the hinge 33 and extending in the front-back (horizontal) direction.

As illustrated in FIGS. 3, 4, 6, and 10, the side gates 11 are each provided with a hinge 34 coupled to a back lower portion thereof, protruding laterally from the back lower portion, and having a bent end portion. The side gates 11 are each provided with a cylindrical boss 34a (which is an example of the "support") disposed on the end portion of the hinge 34 and extending in the front-back (horizontal) direction.

As illustrated in FIG. 6, fitting the boss 33a around the shaft 27 of the corresponding front pivot section 19 from the front side attaches the hinge 33 to the front pivot section 19. Fitting the boss 34a around the shaft 32 of the corresponding back pivot section 20 from the front side attaches the hinge 34 to the back pivot section 20.

The above operations allow each side gate 11 to be attached to the corresponding front and back pivot sections 19 and 20 in such a manner as to be swingable about the corresponding shafts 27 and 32 each extending in the front-back (horizontal) direction (that is, about the axis P3) between the standing position A21 and the open position A22 as illustrated in FIGS. 11 and 12.

The work vehicle configured as above includes: a shaft 27, 32 on a first one of the floor (that is, the floor unit 9) and the gate (that is, the side gates 11); and a support (that is, the respective bosses 33a and 34a of the hinges 33 and 34) on a second one of the floor (that is, the floor unit 9) and the gate (that is, the side gates 11), The above work vehicle is configured such that with the shaft 27, 32 and the support (that is, the respective bosses 33a and 34a of the hinges 33 and 34) attached to each other, the gate (that is, the side gates 11) is swingable about a horizontal axis P3 of each of the shaft 27, 32 and the support (that is, the respective bosses 33a and 34a of the hinges 33 and 34) between a standing position A21, in which the gate (that is, the side gates 11) is oriented upward from the floor (that is, the floor unit 9), and an open position A22, in which the gate (that is, the side gates 11) is oriented downward from the floor (that is, the floor unit 9).

Configuration of Holders for Side Gates

As illustrated in FIGS. 6 to 9, the side gates 11 are provided with a pair of respective left and right holders 29 each attached to the corresponding front pivot section 19. The holders 29 each include an elongate, plate-shaped body 29a, an opening 29b in the body 29a, and a handle 29c coupled to the body 29a. The left and right holders 29 are symmetrical with each other.

The handle 29c is so bent at an angle as to protrude forward or backward from the body 29a, and is disposed through an opening in the corresponding shaft receiver member 28.

Holding the handle 29c with a hand H, a worker is able to swing the holder 29 about a front-back axis P4 relative to the corresponding front pivot section 19 and move the holder 29 along the axis P4 in the front-back direction.

Figure 8:
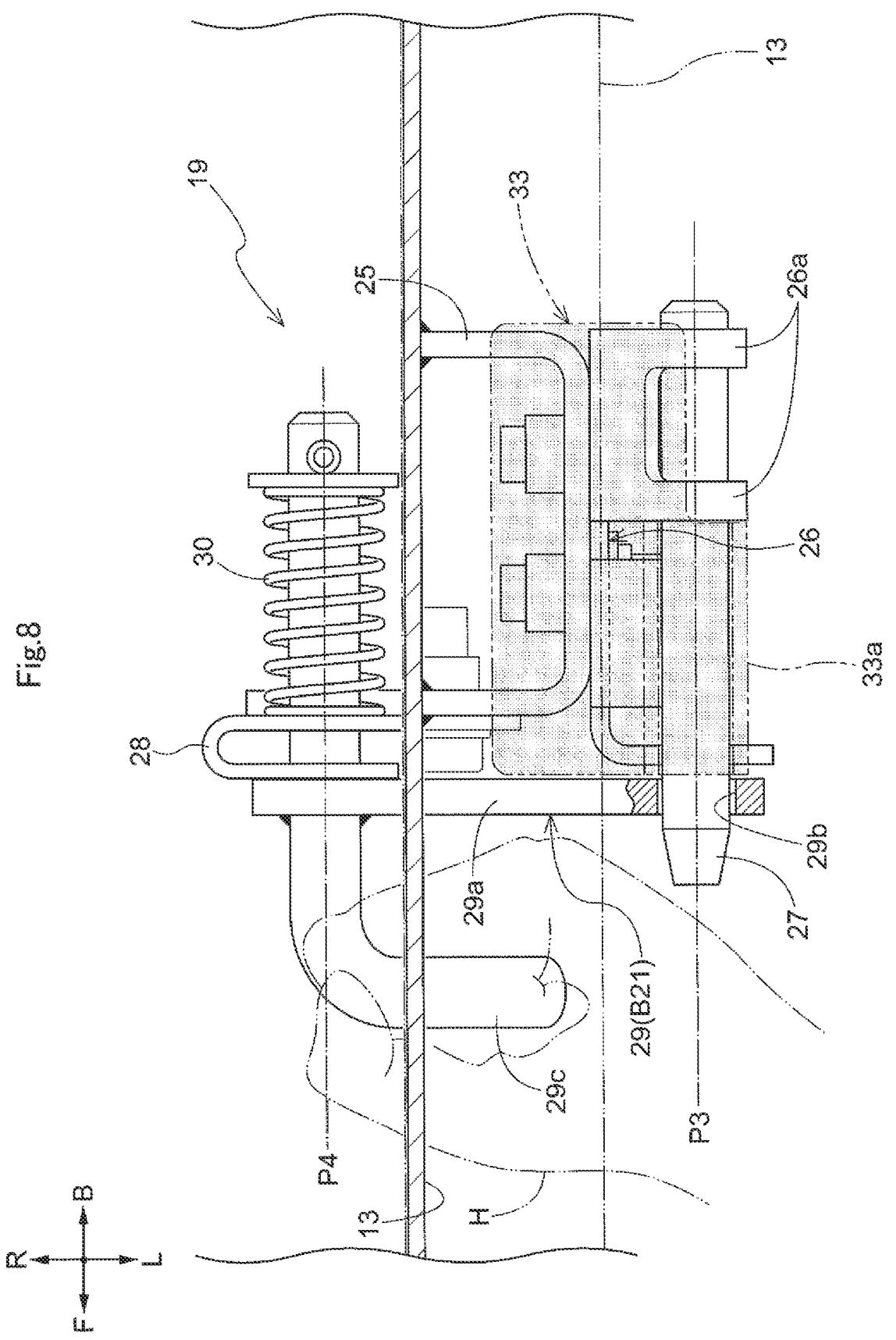
FIG. 8 is a cross-sectional plan view of a front pivot section of a side gate and its surroundings.

The side gates 11 are provided with a pair of respective left and right springs 30 (which is an example of the "urging section") each disposed between an end of the corresponding handle 29*c* and the corresponding shaft receiver member 28 and so compressed from its free length as to urge the holder 29 (specifically, its body 29*a*) toward the corresponding front pivot section 19 (that is, rightward in FIG. 8).

Figure 9:
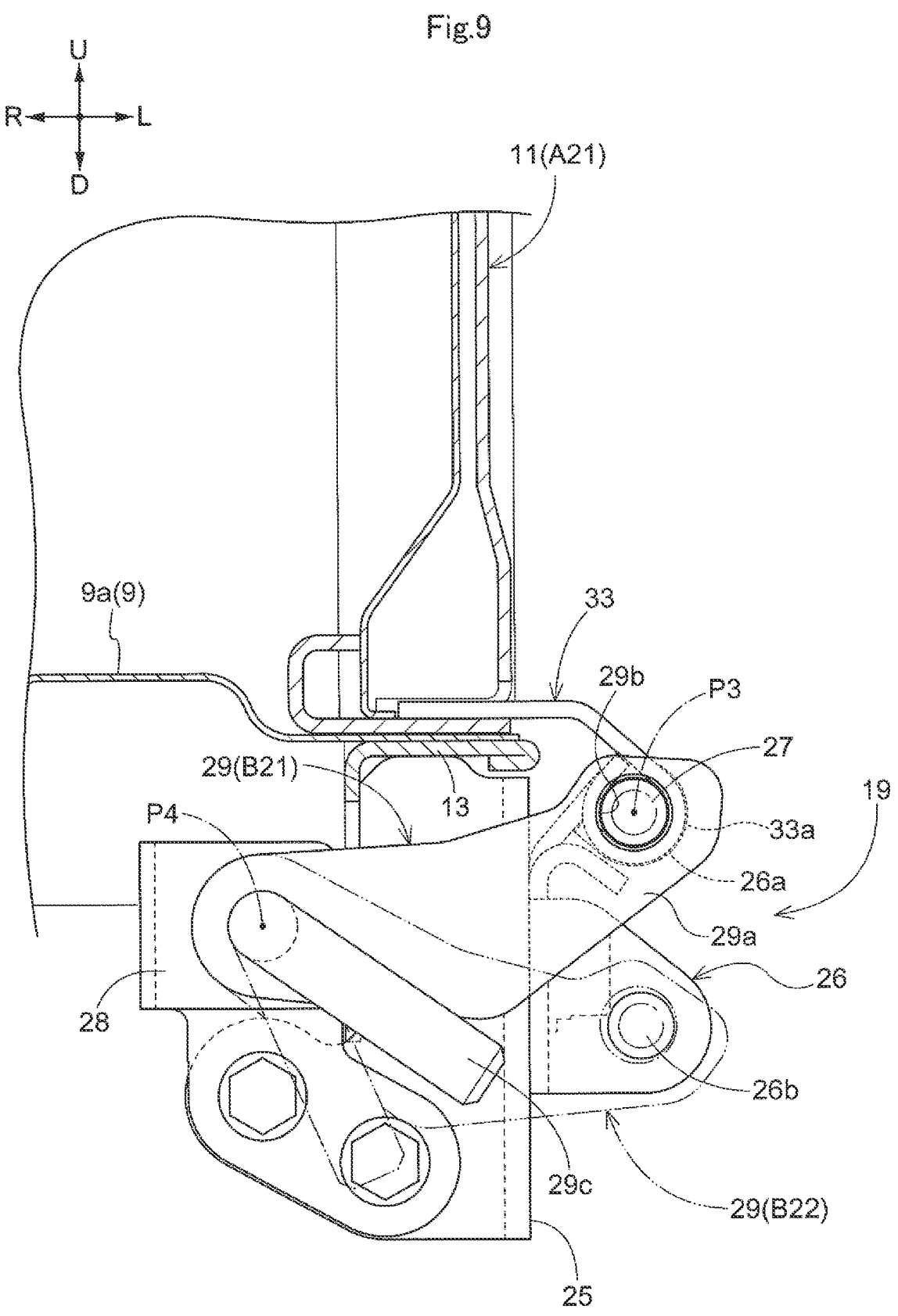
FIG. 9 is a cross-sectional front view of a front pivot section of a side gate and its surroundings.

FIGS. 7, 8, and 9 each illustrate a holder 29 in a first position B21. When a holder 29 is in the first position B21, the corresponding shaft 27 is in the boss 33*a* of the corresponding hinge 33 and has an end in the opening 29*b*. The corresponding spring 30 urges the holder 29 toward the corresponding front pivot section 19 (that is, rightward in FIG. 8), in other words, toward the first position B21.

With the shaft 27 in the opening 29*b* in the holder 29 in the first position B21, moving the side gate 11 forward relative to the floor unit 9 brings the boss 33*a* into contact with the holder 29. This prevents the bosses 33*a* and 34*a* from moving forward apart from the respective shafts 27 and 32.

Detaching Side Gates—1

A worker is able to detach each side gate 11 from the floor unit 9 as illustrated in FIGS. 8 and 9: Holding the handle 29*c* of the corresponding holder 29 with a hand H, the worker moves the holder 29 away from the corresponding front pivot section 19 along the axis P4 (that is, leftward in FIG. 8) while compressing the corresponding spring 30 (that is, against the urging force of the spring 30), and pulls the holder 29 off the corresponding shaft 27 so that the shaft 27 is out of the opening 29*b*.

Next, the worker slightly rotates the holder 29 about the axis P4 clockwise in FIG. 9, and moves the holder 29 toward the front pivot section 19 along the axis P4 (that is, rightward in FIG. 8) to insert the pin 26*b* of the corresponding pivot member 26 into the opening 29*b*, whereby the holder 29 is in a second position B22.

With the holder 29 in the second position B22, the pin 26*b* is in the opening 29*b*, and the spring 30 urges the holder 29 toward the front pivot section 19 (that is, rightward in FIG. 8). The pin 26*b* engaging with the pivot member 26 and the spring 30 urging the holder 29 toward the second position B22 prevents the holder 29 from moving out of the second position B22.

After moving the holder 29 into the second position B22, the worker is able to detach the engagement metal fitting 12*a* of the corresponding fixing handle 12 (see FIGS. 2 and 3) from the engagement section 11*b* of the corresponding side gate 11, detach the engagement metal fitting 22*a* of the corresponding fixing handle 22 (see FIGS. 6 and 7) from the engagement section 11*d* of the side gate 11, attach the engagement metal fitting 22*a* to an engagement section 9*c* of the front wall 9*b*, and detach the corresponding wire 15 (see FIGS. 3 and 5) from the attachment section 11*c* of the side gate 11.

The worker positions the side gate 11 within a range C2 described later (see FIGS. 11 and 12) and moves the side gate 11 forward to move the bosses 33*a* and 34*a* forward apart from the respective shafts 27 and 32 and detach the side gate 11 from the floor unit 9.

The above work vehicle is configured such that the gate (that is, the side gates 11) is detachable from the floor (that is, the floor unit 9) with the shaft 27, 32 and the support (that is, the respective bosses 33*a* and 34*a* of the hinges 33 and 34) apart from each other.

The above work vehicle may be configured such that the gate (that is, the side gates 11) is at a lateral portion of the floor (that is, the floor unit 9), the shaft 27, 32 is disposed on the floor (that is, the floor unit 9) in a front-back direction, and the support is a boss 33*a*, 34*a* on the gate (that is, the side gates 11) in the front-back direction.

The above work vehicle may be further configured such that the gate (that is, the side gates 11) is swingable about the axis P3 with the shaft 27, 32 in the boss 33*a*, 34*a* and detachable from the floor (that is, the floor unit 9) with the boss 33*a*, 34*a* apart forward or backward from the shaft 27, 32.

Detaching Side Gates—2

As illustrated in FIGS. 11 and 12, each side gate 11 may be in a lower intermediate position A24, which is above the open position A22 by a predetermined angle, or in an upper intermediate position A23, which is below the standing position A21 by a predetermined angle and which is above the lower intermediate position A24.

With the side gate 11 within a range C1 between the standing position A21 and the upper intermediate position A23, moving the side gate 11 forward brings a front end portion of the side gate 11 into contact with the corresponding fixing handle 22.

With the side gate 11 within a range C3 between the open position A22 and the lower intermediate position A24, moving the side gate 11 forward brings the corresponding hinge 34 into contact with the stopper 31*b* of the pivot member 31 of the corresponding back pivot section 20.

The side gate 11 being within the range C1 or C3 prevents the worker from moving the side gate 11 forward to move the bosses 33*a* and 34*a* forward apart from the respective shafts 27 and 32.

With the side gate 11 within a range C2 between the upper intermediate position A23 and the lower intermediate position A24, moving the side gate 11 forward does not bring a front end portion of the side gate 11 into contact with the corresponding fixing handle 22, and does not bring the corresponding hinge 34 into contact with the corresponding stopper 31*b*.

The side gate 11 being within the range C2 allows the worker to move the side gate 11 forward to move the bosses 33*a* and 34*a* forward apart from the respective shafts 27 and 32 and detach the side gate 11 from the floor unit 9.

The above work vehicle may be configured such that the gate (that is, the side gates 11) is swingable to a lower intermediate position A24 above the open position A22 by an angle.

The above work vehicle includes: a first restrictor (that is, the stoppers 31*b*) configured to prevent the boss 33*a*, 34*a* from becoming apart forward or backward from the shaft 27, 32 with the holder 29 in the second position B22 and the gate (that is, the side gates 11) between the open position A22 and the lower intermediate position A24.

The above work vehicle may be configured such that the gate (that is, the side gates 11) is swingable to an upper intermediate position A23 below the standing position A21 by an angle and above the lower intermediate position A24.

The above work vehicle includes: a second restrictor (that is, the fixing handles 22) configured to prevent the boss 33*a*, 34*a* from becoming apart forward or backward from the shaft 27, 32 with the holder 29 in the second position B22 and the gate (that is, the side gates 11) between the standing position A21 and the upper intermediate position A23.

The above work vehicle may be configured such that the second restrictor is a fixing section (that is, the fixing handles 22) manually operable to fix the gate (that is, the side gates 11) in the standing position A21 and unfix the gate (that is, the side gates 11) from the standing position A21.

Attaching Side Gates

A worker is able to attach each side gate 11 to the floor unit 9 in a manner reverse to the above as illustrated in FIGS. 6, 11, and 12. The worker positions the side gate 11 within the range C2 and moves the side gate 11 backward to fit the bosses 33*a* and 34*a* around the respective shafts 27 and 32 from the front side.

As illustrated in FIGS. 8 and 9, holding the handle 29*c* of the corresponding holder 29 in the second position B22 with a hand H, the worker moves the holder 29 apart from the corresponding front pivot section 19 along the axis P4 (that is, leftward in FIG. 8) while compressing the corresponding spring 30 (that is, against the urging force of the spring 30), and pulls the holder 29 off the pin 26*b* of the corresponding pivot member 26 so that the pin 26*b* is out of the opening 29*b*.

Next, the worker slightly rotates the holder 29 about the axis P4 counterclockwise in FIG. 9, and moves the holder 29 toward the front pivot section 19 along the axis P4 (that is, rightward in FIG. 8) to insert an end of the shaft 27 into the opening 29*b*, so that the holder 29 is in the first position B21.

The work vehicle configured as above includes: a holder 29 manually operable between (i) a first position B21, in which the holder 29 prevents the shaft 27, 32 and the support (that is, the respective bosses 33*a* and 34*a* of the hinges 33 and 34) from becoming apart from each other and holds the gate (that is, the side gates 11) in such a manner that the gate (that is, the side gates 11) is swingable about the axis P3, and (ii) a second position B22, in which the holder 29 allows the shaft 27, 32 and the support (that is, the respective bosses 33*a* and 34*a* of the hinges 33 and 34) to become apart from each other and allows the gate (that is, the side gates 11) to be detached from the floor (that is, the floor unit 9).

The above work vehicle may include: an urging section (that is, the springs 30) urging the holder 29 toward the first position B21.

The above work vehicle may include a second position holder (that is, the respective pins 26*b* of the pivot members 26) configured to hold the holder 29 in the second position B22.

The above work vehicle may be configured such that the holder 29 has an opening 29*b*, with the holder 29 in the first position B21, the shaft 27, 32 is in the boss 33*a*, 34*a* and has an end in the opening 29*b*, and in the first position B21, the holder 29 engages with the boss 33*a*, 34*a* to prevent the boss 33*a*, 34*a* from becoming apart forward or backward from the shaft 27, 32.

First Alternative Embodiment

The embodiment described above may be altered such that the shafts 16 are provided for the floor unit 9 and that the depressions 14*a* (support) are provided for the rear gate 10.

The depressions 14*a* are, in this case, open downward.

Second Alternative Embodiment

The rear gate 10 may include elements equivalent to such elements of the side gates 11 as the holders 29, the front pivot sections 19, and the back pivot sections 20 illustrated in FIGS. 6 to 10.

The rear gate 10 is, in this case, movable to the left or right to be detached from the floor unit 9. The rear gate 10 may further be so movable even if the rear gate 10 is within a range corresponding to the range C1 or C3.

Third Alternative Embodiment

The embodiment described above may be altered such that the shafts 27 and 32 are provided for the side gates 11 and that the bosses 33*a* and 34*a* (support) are provided for the floor unit 9.

Fourth Alternative Embodiment

The side gates 11 may each be movable forward from the standing position A21 to be detached from the floor unit 9 even if the side gate 11 is within the range C1.

The embodiment described above may be altered such that moving each side gate 11 backward moves the bosses 33*a* and 34*a* apart from the shafts 27 and 32 and detaches the side gate 11 from the floor unit 9.

The side gates 11 may include elements equivalent to such elements of the rear gate 10 as the holders 17 and the support brackets 14 illustrated in FIGS. 3, 4, and 5.

Fifth Alternative Embodiment

The side gates 11 may be undetachably coupled to the floor unit 9.

This alternative embodiment may further be configured such that the side gates 11 include elements equivalent to such elements of the rear gate 10 as the holders 17 and the support brackets 14 illustrated in FIGS. 3, 4, and 5 and that the rear gate 10 includes elements equivalent to such elements of the side gates 11 as the holders 29, the front pivot sections 19, and the back pivot sections 20 illustrated in FIGS. 6 to 10.

Sixth Alternative Embodiment

The work vehicle described above may include a cargo box 8 at a front portion of the body 3 and a driver section at a back portion of the body 3. The work vehicle, in this case, includes a front gate (which is an example of the "gate") (not illustrated in the drawings) at a front portion of the cargo box 8 (specifically, of the floor unit 9).

The front and rear wheels 1 and 2 may be replaced with a crawler travel device (not illustrated in the drawings) on the body 3.

The present invention is applicable to any work vehicle including a cargo box on its body.

The invention claimed is:

1. A work vehicle, comprising:
a body;
a travel device provided for the body:
a cargo box disposed on the body and comprising a floor and a gate;
a shaft on a first one of the floor and the gate;
a support on a second one of the floor and the gate; and
a holder, and
wherein:
with the shaft and support attached to each other, the gate is swingable about a horizontal axis of each of the shaft and the support between a standing position, in which the gate is oriented upward from the floor, and an open position, in which the gate is oriented downward from the floor,
the gate is detachable from the floor with the shaft and the support apart from each other,

the holder is manually operable between (i) a first position, in which the holder prevents the shaft and the support from becoming apart from each other and holds the gate in such a manner that the gate is swingable about the axis, and (ii) a second position, in which the holder allows the shaft and the support to become apart from each other and allows the gate to be detached from the floor.

2. The work vehicle according to claim 1, further comprising:

an urging section urging the holder toward the first position.

3. The work vehicle according to claim 1, further comprising:

a second position holder configured to hold the holder in the second position.

4. The work vehicle according to claim 1, wherein:

the gate is at a back or front portion of the floor, the shaft is disposed laterally on the gate, the support is an upwardly open depression in the floor, and the gate is swingable about the axis with the shaft in the depression and detachable from the floor with the shaft apart upward from the depression.

5. The work vehicle according to claim 4, wherein:

the holder has an opening, with the holder in the first position, the shaft is in the depression and has an end in the opening, and in the first position, the holder engages with the shaft to prevent the shaft from becoming apart upward from the depression.

6. The work vehicle according to claim 1, wherein:

the gate is at a lateral portion of the floor, the shaft is disposed on the floor in a front-back direction, the support is a boss disposed on the gate in the front-back direction, and

16 the gate is swingable about the axis with the shaft in the boss and detachable from the floor with the boss apart forward or backward from the shaft.

7. The work vehicle according to claim 6, wherein:

the holder has an opening, with the holder in the first position, the shaft is in the boss and has an end in the opening, and in the first position, the holder engages with the boss to prevent the boss from becoming apart forward or backward from the shaft.

8. The work vehicle according to claim 6, wherein:

the gate is swingable to a lower intermediate position above the open position by an angle, and the work vehicle further comprises:

a first restrictor configured to prevent the boss from becoming apart forward or backward from the shaft with the holder in the second position and the gate between the open position and the lower intermediate position.

9. The work vehicle according to claim 8, wherein:

the gate is swingable to an upper intermediate position below the standing position by an angle and above the lower intermediate position, and the work vehicle further comprises:

a second restrictor configured to prevent the boss from becoming apart forward or backward from the shaft with the holder in the second position and the gate between the standing position and the upper intermediate position.

10. The work vehicle according to claim 9, wherein:

the second restrictor is a fixing section manually operable to fix the gate in the standing position and unfix the gate from the standing position.

* * * * *